Aug. 14, 1934.  R. R. GUEMPEL  1,970,453
GRINDING MACHINE
Filed July 30, 1932

INVENTOR:
ROBERT R. GUEMPEL,
BY Gales P. Moore
HIS ATTORNEY.

Patented Aug. 14, 1934

1,970,453

UNITED STATES PATENT OFFICE 1,970,453

GRINDING MACHINE

Robert R. Guempel, Hasbrouck Heights, N. J., assignor to General Motors Corporation, Detroit, Mich., a corporation of Delaware Application July 30, 1932, Serial No. 626,571

5 Claims. (Cl. 51—117)

This invention relates to grinding machines and comprises all of the features of novelty herein disclosed in connection with a machine for end grinding rings or sleeves.

An object of the invention is to provide an improved end grinding machine. Another object is to provide a precision machine for simultaneously grinding the opposite end faces of a round article in a manner to make said faces exactly parallel and at right angles to the axis of the piece. Another object is to provide apparatus for presenting a rotating work-piece to an operating tool and positively controlling the position of the work-axis in relation to the tool. Another object is to provide a chuckless end grinding machine having positive control of a rotating work-piece and capable of quickly and unerringly holding the piece rotatably in a desired grinding relation to a grinding wheel. Still another object is to provide an improved method of grinding the ends of a round article.

To these ends and also to improve generally upon machines of this character, the invention consists in the various matters hereinafter described and claimed. In its broader aspects, the invention is not necessarily limited to the specific construction selected for mere illustrative purposes in the accompanying drawing in which Fig. 1 is a side elevation of the machine partly broken away and with one grinding wheel removed.

Figure 3:
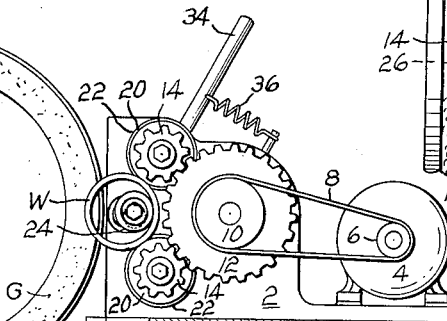
Fig. 3 is a rear elevation of the head with parts in section and with some of the driving gearing removed.
Figure 1:
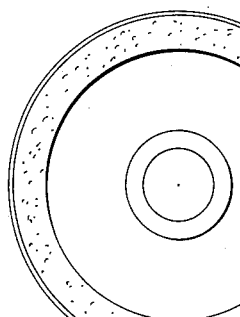
Figure 4:
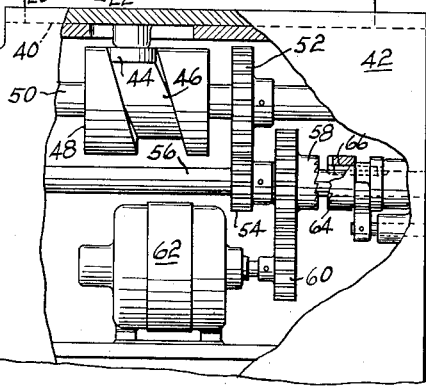
Figs. 4 and 5 are sectional views of mountings for certain rolls.
Figure 4:
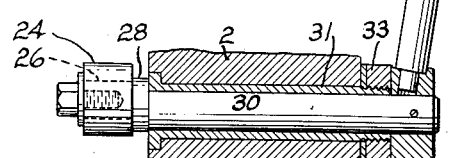
Figure 2:
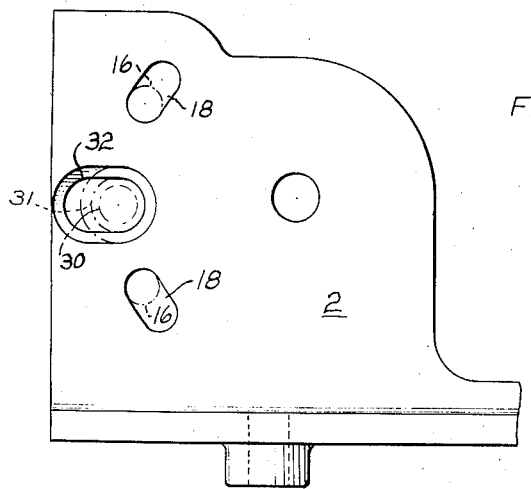
Fig. 2 is an enlarged side elevation of a slide or head.
Figure 5:
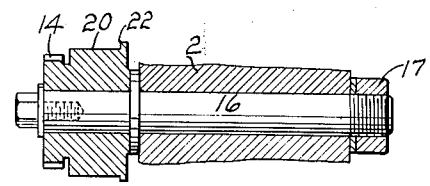

A hollow work-piece W, herein shown as a sleeve or ring ready to have the ends ground off flat, is rotatably supported and driven by a plurality of rolls journalled on a head which is slidable to carry the piece between ring grinding wheels G whose radial operating faces are precisely parallel. The head which is indicated at 2 carries a motor 4 whose shaft has a pulley 6 driving a belt 8 which drives a pulley 10 on a shaft carrying a driving member in the form of a gear 12. The gear drives a pair of gears 14 rotatable on shafts 16 which are adjustably secured in the head 2. The head desirably has arcuate slots 18 curved about a center at the center of the gear 12 and fitting the shafts 16 so that the latter can be clamped by nuts 17 in various selected positions, thus to provide for different sizes of work as will appear.

Integral with or secured to each gear 14 is a roll or wheel 20 having an end flange 22. A third roll or wheel 24 enters the work-piece W and engages the inner wall thereof to press the outer wall of the piece against the driving rolls 20. The roll 24 enters more or less the space between the driving rolls 20 and is journalled on a stud 26 carried by a short arm 28 on a rock shaft 30 which is rockable in a bushing 31 in the head. The bushing is adjustably clamped in a straight slot 32 by a nut 33 so that the shaft 30 and roll 24 can be initially adjusted for the size of the work, this adjustment being accompanied when necessary by adjustment of the shafts 16 in their arcuate slots 18. Obviously larger pieces need either a spreading apart of the rolls 20 or an adjustment of the roll 24 to the left, or both adjustments might be desirable. The stud 26 and rock shaft 30 are in eccentric relation to one another so that rocking of the shaft by a lever 34 will give the roll 24 a bodily movement in an arc to move the work into or out of engagement with the driving rolls 20. A coil spring 36 provides means for pressing the roll 24 yieldingly against the work and making the work yieldingly engage the driving rolls 20 for frictional driving engagement thereby.

The head 2 slides in ways 40 on a frame 42 in a direction exactly perpendicular to the axis of the piece or parallel to the operating portions of the grinding wheels. A cam roller 44 carried by the head engages a cam slot 46 in a cam drum 48 on a shaft 50 which is rotated by gears 52 and 54 from a countershaft 56. A clutch member 58, which is loose on shaft 56, is driven by gears 60 from a motor 62. To make the clutch member 58 rotate the shaft 56, a second clutch member 64 is keyed to the shaft at 66 and is shifted by a rod 68.

When the work-piece is to have the ends squared, the lever 34 is actuated counterclockwise to make room for slipping the piece over the roll 24 with its foremost end against the flanges 22. Upon releasing the lever, the spring 36 urges the piece unerringly to the correct position. The rolls 20 have line contact with the work, and, when both the work and the rolls are cylindrical, as will usually be the case, the roll shafts are perpendicular to the operative portions of the grinding wheels, or parallel to the axes of the grinding wheels if the latter are ring wheels as is preferred. Thus the work is reliably positioned with its axis in a definite line which remains perpendicular to the operative portions of the wheels. The flanges 22 have their inner faces in line with one of the wheels and the work may be urged against such flanges in any suitable way, as by a slight tilting or skewing of the roll 24. The roll 24 is located near one end of the head 2 so that a segment of the work-piece will project free and clear of the head ready to be advanced between the wheels. Rotation of the piece insures uniform grinding of all parts of both end faces thereof and such end face will be at right angles to the axis of the piece. The machine can be stopped with the head retracted by pulling on the clutch shifting rod 68. Any suitable means may be provided to adjust the spacing of the grinding wheels in accordance with the length of the work.

I claim:

1. In a machine of the character described, a head for supporting and rotating a hollow round article with a segment of the article projecting beyond the end of the head, the head comprising a pair of rolls journalled thereon for rolling engagement with the exterior wall of the article, a third roll journalled on the head near said end thereof and between the rolls of said pair to engage the inner wall of the article and a pair of grinding wheels at said end of the head and arranged to simultaneously grind the opposite ends of the projecting segment; substantially as described.

2. In a machine of the character described, a head for supporting and rotating a hollow round article with a segment of the article projecting beyond the end of the head, the head comprising a pair of rolls journalled thereon for rolling engagement with the exterior wall of the article, and a third roll journalled on the head near said end thereof and between the rolls of said pair to engage the inner wall of the article, and a rock shaft for moving the third roll in and out with respect to the space between the rolls of said pair; substantially as described.

3. In a machine of the character described, a head, a driving gear on the head, the head having slots curved about a center at the center of the gear, shafts extending through the slots and adjustable therein, rolls journalled on the shafts, and a gear attached to each roll and meshing with the driving gear; substantially as described.

4. In a machine of the character described, a head, a pair of rolls, shafts supporting the rolls, a rotatable member having driving connection with the rolls, the head having slots curved about a center at the center of the rotatable member, the shafts extending through the slots and adjustable therein, and means for holding a round work-piece against the rolls; substantially as described.

5. In a machine of the character described, a head, a roll, a shaft supporting the roll, a rotatable member having driving connection with the roll, the head having a slot curved about a center at the center of the member, the shaft extending through the slot and adjustable therein, the roll being arranged for rolling engagement with a round work-piece, and other work engaging members for holding the work-piece against the driven roll; substantially as described.

ROBERT R. GUEMPEL.